United States Patent
Izuha

(10) Patent No.: US 7,752,032 B2
(45) Date of Patent: Jul. 6, 2010

(54) APPARATUS AND METHOD FOR TRANSLATING JAPANESE INTO CHINESE USING A THESAURUS AND SIMILARITY MEASUREMENTS, AND COMPUTER PROGRAM THEREFOR

(75) Inventor: Tatsuya Izuha, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 973 days.

(21) Appl. No.: 11/325,427

(22) Filed: Jan. 5, 2006

(65) Prior Publication Data

US 2006/0241934 A1   Oct. 26, 2006

(30) Foreign Application Priority Data

Apr. 26, 2005  (JP)  ............... 2005/128519

(51) Int. Cl.
G06F 17/28 (2006.01)
G06F 17/20 (2006.01)
G06F 17/27 (2006.01)
G06F 17/21 (2006.01)
G10L 21/00 (2006.01)

(52) U.S. Cl. .................. 704/7; 704/2; 704/3; 704/4; 704/5; 704/8; 704/9; 704/10; 704/277

(58) Field of Classification Search ................ 704/1–10
See application file for complete search history.

(56) References Cited

U.S. PATENT DOCUMENTS

| | | | | |
|---|---|---|---|---|
| 4,635,199 A | * | 1/1987 | Muraki ........................... | 704/2 |
| 5,267,156 A | * | 11/1993 | Nomiyama ................... | 704/10 |
| 5,285,386 A | * | 2/1994 | Kuo .............................. | 704/2 |
| 5,401,065 A | * | 3/1995 | Okumura et al. ............ | 285/328 |
| 5,539,116 A | * | 7/1996 | Liotta et al. .................. | 544/317 |

(Continued)

FOREIGN PATENT DOCUMENTS

JP          04256171 A  *  9/1992

(Continued)

OTHER PUBLICATIONS

Nagao, M.: 1984. 'A Framework of a Mechanical Translation between Japanese and English by Analogy Principle', in A. Elithorn and R. Banerji (eds), Artificial and Human Intelligence, Amsterdam: North-Holland, pp. 173-180.*

(Continued)

*Primary Examiner*—David R Hudspeth
*Assistant Examiner*—Paras Shah
(74) *Attorney, Agent, or Firm*—Finnegan, Henderson, Farabow, Garrett & Dunner, L.L.P.

(57) ABSTRACT

A Japanese-to-Chinese machine translation apparatus includes, a translation dictionary memory that stores a Japanese-to-Chinese translation dictionary; a thesaurus memory that stores a Japanese thesaurus; a translation dictionary searching unit that searches the Japanese-to-Chinese translation dictionary for a Chinese word associated with an input Japanese word; a thesaurus searching unit that searches the Japanese thesaurus for the synonym associated with the input Japanese word when plural Chinese words are hit as a result of search, a similarity calculating unit that calculates a degree of similarity between the synonym and the plural Chinese words for each Chinese word, and a translation selecting unit that selects a Chinese word with a highest degree of similarity as a translation of the input Japanese word.

12 Claims, 9 Drawing Sheets

U.S. PATENT DOCUMENTS

| | | | | |
|---|---|---|---|---|
| 5,659,765 | A * | 8/1997 | Nii | 704/4 |
| 5,768,603 | A * | 6/1998 | Brown et al. | 704/9 |
| 6,161,083 | A * | 12/2000 | Franz et al. | 704/4 |
| 6,182,027 | B1 * | 1/2001 | Nasukawa et al. | 704/2 |
| 6,523,000 | B1 * | 2/2003 | Ando et al. | 704/2 |
| 6,952,665 | B1 * | 10/2005 | Shimomura et al. | 704/2 |
| 7,107,204 | B1 * | 9/2006 | Liu et al. | 704/2 |
| 7,119,237 | B2 * | 10/2006 | Prinz et al. | 568/885 |
| 7,149,681 | B2 * | 12/2006 | Hu et al. | 704/2 |
| 7,295,964 | B2 * | 11/2007 | Suzuki | 704/2 |
| 7,376,648 | B2 * | 5/2008 | Johnson | 707/4 |
| 2004/0186732 | A1 * | 9/2004 | Okura et al. | 704/277 |
| 2005/0137854 | A1 * | 6/2005 | Cancedda et al. | 704/9 |
| 2005/0267734 | A1 * | 12/2005 | Masuyama | 704/2 |

FOREIGN PATENT DOCUMENTS

| | | | |
|---|---|---|---|
| JP | 410269221 A | * | 10/1997 |
| JP | 3034295 | | 2/2000 |

OTHER PUBLICATIONS

Harold Somers. 1999. Review Article: Example-based Machine Translation. Machine Translation, 14:113-157.*

* cited by examiner

FIG.2

| JAPANESE WORD | CHINESE TRANSLATION |
|---|---|
| システム | 组织；系统；体系 (C201－C202－C203) — C210 (J210) |
| ホログラム | 全息图 |
| ローカル | 地方；地方性；局部 (C221－C222－C223) — C220 (J220) |
| …… | …… |

| ORIGINAL WORD | SYNONYM |
|---|---|
| コンピュータ (J310) | 計算機 (J311) |
| ローカル (J320) | 局所 (J321) |
| アルゴリズム (J330) | 算法 (J331) |
| しきたり (J340) | 慣例 (J341) |
| …… | …… |

| CHINESE KANJI CHARACTER | JAPANESE KANJI CHARACTER |
|---|---|
| 局 | 局 |
| 所 | 所 |
| 地 | 地 |
| 方 | 方 |
| 性 | 性 |
| 部 | 部 |
| 组 | 組 |
| 织 | 織 |
| …… | …… |

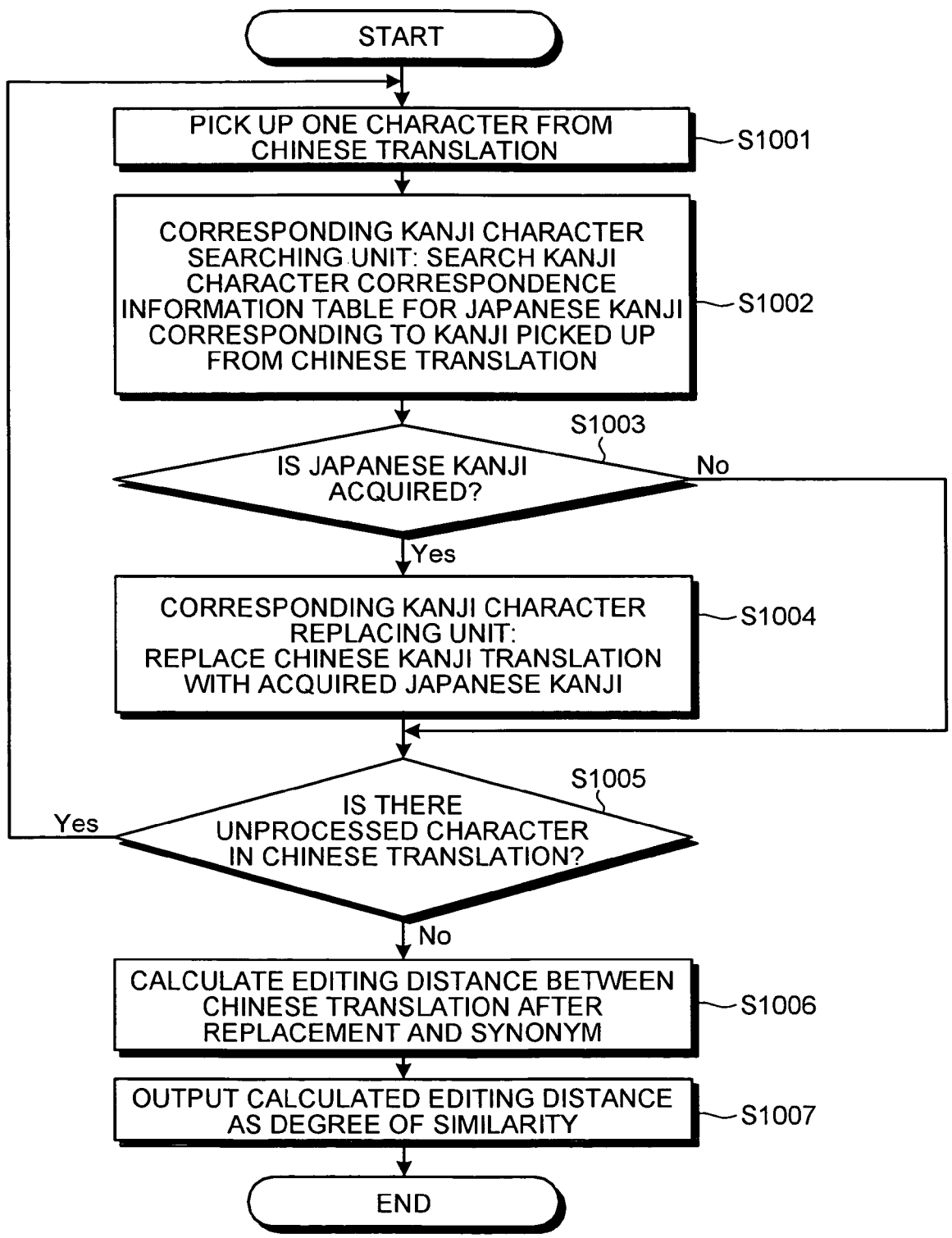

APPARATUS AND METHOD FOR TRANSLATING JAPANESE INTO CHINESE USING A THESAURUS AND SIMILARITY MEASUREMENTS, AND COMPUTER PROGRAM THEREFOR

CROSS-REFERENCE TO RELATED APPLICATIONS

This application is based upon and claims the benefit of priority from the prior Japanese Patent Application No. 2005-128519, filed on Apr. 26, 2005; the entire contents of which are incorporated herein by reference.

BACKGROUND OF THE INVENTION

1. Field of the Invention

The present invention relates to a Japanese-to-Chinese machine translation apparatus which translates input Japanese into Chinese, a method of Japanese-to-Chinese machine translation, and a computer program product for Japanese-to-Chinese machine translation therefor.

2. Description of the Related Art

Generally, a Japanese-to-Chinese machine translation apparatus that translates input Japanese into corresponding Chinese includes a Japanese-to-Chinese translation dictionary in which a Japanese word and a Chinese translation thereof are stored in association with each other. When Japanese is supplied as an input, the Japanese-to-Chinese machine translation apparatus searches the Japanese-to-Chinese translation dictionary employing whole or a part of the input Japanese as a search key. Then, the Japanese-to-Chinese machine translation apparatus formulates corresponding Chinese to be output based on the search results of the Chinese translation.

In Japanese-to-Chinese translation, one Japanese word mostly needs to be translated into different Chinese words depending on a context. Hence, the Japanese-to-Chinese translation dictionary as mentioned above usually stores plural Chinese words as translations corresponding to one Japanese word. The Japanese-to-Chinese machine translation apparatus is required to perform processing to select an appropriate translation from plural Chinese translations depending on the context in which a corresponding Japanese word appears.

Conventionally, various techniques are employed to meet such a requirement. One commonly employed technique is to prepare a rule in advance for determining a translation of a particular word with reference to words that appear in the vicinity of the particular word or dependent words, and to select a translation based on the prepared rule. Another proposed technique is a translation learning in which a user checks an original text and a result of machine translation, and designates appropriate translation to the original word if the translation is inappropriate. Still another proposed technique is to supply a document written in a target language and relating to a field of an original document at the time of translation to the translation apparatus, and to make the translation apparatus preferentially select words appear in the supplied related document as translation (see, for example, Japanese Patent No. 3034295).

The conventional techniques as described above, however, are not advantageous. The previous preparation of translation determining rules implies preparation of an enormous amount of rules necessary for translation, which is difficult to perfectly realize in advance. The designation of translation by the user, on the other hand, requires the user to assign an appropriate translation to each word, resulting in an undue workload on the user. In addition, only the user who has the familiarity with the original language and the target language can perform such an operation. The provision of related document at the translation sometimes results in a preferential selection of inappropriate words since the exact correspondence between the original text and the translation is not known.

SUMMARY OF THE INVENTION

According to one aspect of the present invention, a Japanese-to-Chinese machine translation apparatus includes, a translation dictionary memory that stores a Japanese-to-Chinese translation dictionary in which a Japanese word and at least one Chinese word which is a translation of the Japanese word are registered in association with each other, a thesaurus memory that stores a Japanese thesaurus in which a Japanese word and a synonym of the Japanese word are registered in association with each other, the synonym being a Japanese word representing a same meaning with the associated Japanese word in a different expression, a translation dictionary searching unit that searches the Japanese-to-Chinese translation dictionary for a Chinese word that is associated with an input Japanese word, a thesaurus searching unit that searches the Japanese thesaurus for the synonym that is associated with the input Japanese word when plural Chinese words are hit as a result of search as the Chinese word that is associated with the input Japanese word, a similarity calculating unit that calculates a degree of similarity which indicates a degree of association between the synonym and each of the plural Chinese words associated with the input Japanese word, for each of the plural Chinese words, and a translation selecting unit that selects a Chinese word with a highest degree of similarity as a translation of the input Japanese word.

According to another aspect of the present invention, a method of Japanese-to-Chinese machine translation, includes, searching a Japanese-to-Chinese translation dictionary stored in a memory, in which a Japanese word and at least one Chinese word which is a translation of the Japanese word are registered in association with each other, for a Chinese word associated with an input Japanese word, searching a Japanese thesaurus stored in a memory, in which a Japanese word and a synonym of the Japanese word are registered in association with each other, the synonym being a Japanese word representing a same meaning in a different expression, for a synonym associated with the input Japanese word, when plural Chinese words are found to be associated with the input Japanese word as a result of search, calculating a degree of similarity, which indicates a degree of association between the synonym and the plural Chinese words associated with the input Japanese word, for each of the plural Chinese words, and selecting a Chinese word with a highest degree of similarity as a translation of the input Japanese word.

A computer program product according to still another aspect of the present invention has a computer readable medium including programmed instructions for executing Japanese-to-Chinese machine translation which is executable on a computer, wherein the instructions, when executed by a computer, cause the computer to perform, searching a Japanese-to-Chinese translation dictionary stored in a memory, in which a Japanese word and at least one Chinese word which is a translation of the Japanese word are registered in association with each other, for a Chinese word associated with an input Japanese word, searching a Japanese thesaurus stored in a memory, in which a Japanese word and a synonym of the Japanese word are registered in association with each other, the synonym being a Japanese word representing a same meaning in a different expression, for a synonym associated with the input Japanese word, when plural Chinese words are found to be associated with the input Japanese word as a result of search, calculating a degree of similarity, which indicates a degree of association between the synonym and the plural Chinese words associated with the input Japanese word, for each of the plural Chinese words, and selecting a Chinese word with a highest degree of similarity as a translation of the input Japanese word.

BRIEF DESCRIPTION OF THE DRAWINGS

FIG. 2 is an explanatory diagram of an example of data structure of a Japanese-to-Chinese translation dictionary;

FIG. 3 is an explanatory diagram of an example of data structure of a Japanese thesaurus;

FIG. 4 is an explanatory diagram of an example of data structure of a kanji character correspondence information table;

FIG. 10 is a flowchart of an overall process sequence of a similarity calculation according to the second embodiment.

DETAILED DESCRIPTION OF THE PREFERRED EMBODIMENTS

Exemplary embodiments of a Japanese-to-Chinese machine translation apparatus, a method of Japanese-to-Chinese machine translation, and a computer program product for Japanese-to-Chinese machine translation according to the present invention will now be described in detail below with reference to the accompanying drawings.

A Japanese-to-Chinese machine translation apparatus according to a first embodiment, when plural Chinese translations are found for a Japanese input as a result of search, searches a Japanese thesaurus for a synonym of the input Japanese word, and selects and outputs a Chinese translation with a highest degree of similarity, which indicates a degree of association between a kanji included in the Chinese translation and the Japanese synonym.

Figure 1:
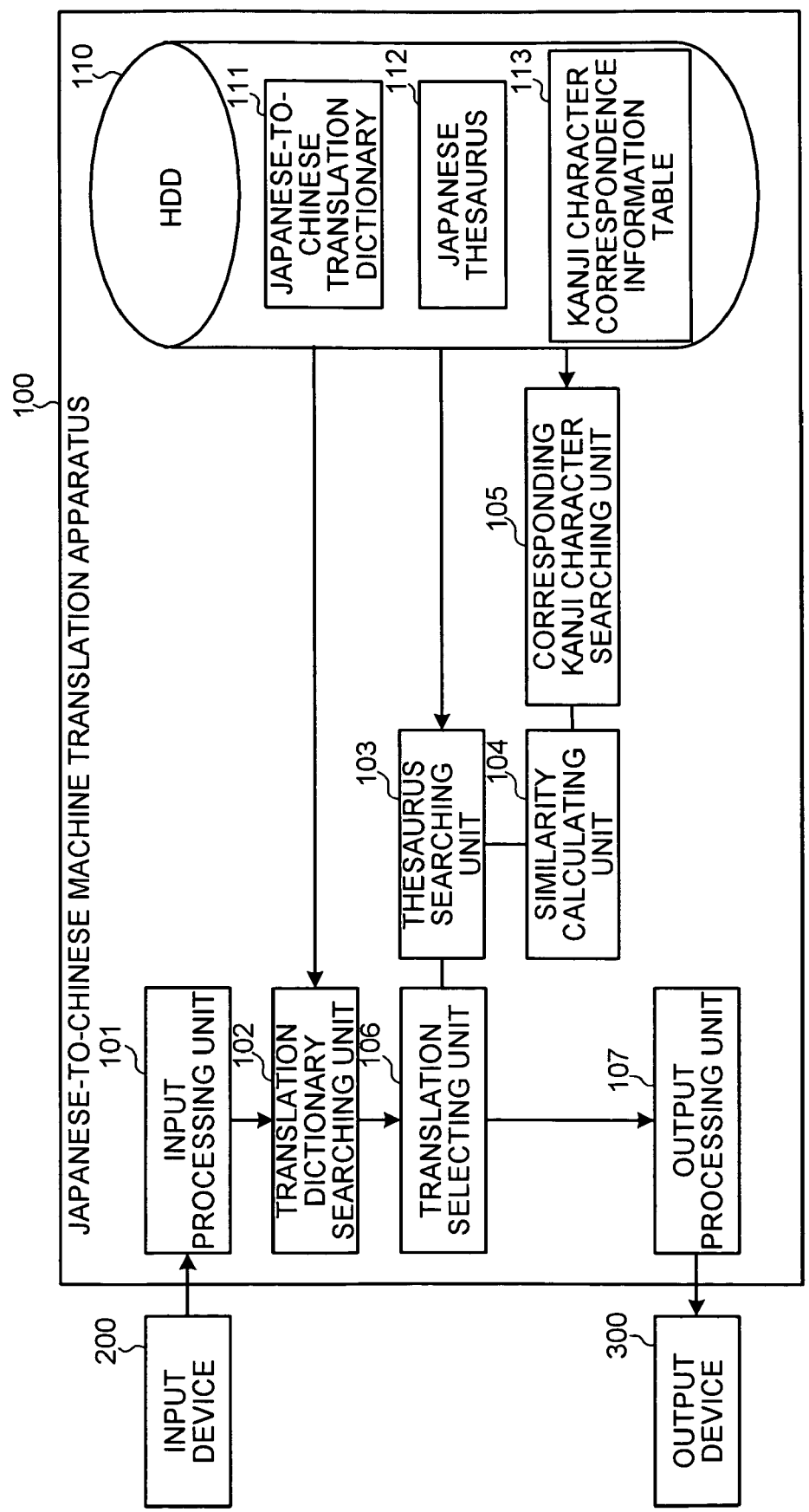
FIG. 1 is a block diagram of a structure of a Japanese-to-Chinese machine translation apparatus according to a first embodiment of the present invention.

FIG. 1 is a block diagram of a structure of a Japanese-to-Chinese machine translation apparatus 100 according to the first embodiment. As shown in FIG. 1, the Japanese-to-Chinese machine translation apparatus 100 includes an input processing unit 101, a translation dictionary searching unit 102, a thesaurus searching unit 103, a similarity calculating unit 104, a corresponding kanji character searching unit 105, a translation selecting unit 106, an output processing unit 107, and a hard disk drive (HDD) 110.

Further, the Japanese-to-Chinese machine translation apparatus 100 according to the first embodiment is connected to an input device 200, such as a keyboard, for an input of Japanese by the user, and an output device 300, such as a display or a printer, for an output of a Chinese translation to the user.

The input processing unit 101 receives an input of Japanese from the input device 200. The translation dictionary searching unit 102 searches a Japanese-to-Chinese translation dictionary 111 using the supplied Japanese input received by the input processing unit 101 as a search key, and retrieves at least one Chinese translation corresponding to the input Japanese.

The thesaurus searching unit 103 searches a Japanese thesaurus 112 using the supplied Japanese input received by the input processing unit 101 as a search key, and retrieves a synonym of the input Japanese. Here, "synonym" means a Japanese word which has a same meaning with a pertinent Japanese word in a different expression. Detailed data structure of the Japanese thesaurus 112 will be described later.

The similarity calculating unit 104 calculates a degree of similarity which indicates a degree of correlation between the Chinese translation retrieved by the translation dictionary searching unit 102 and the synonym retrieved by the thesaurus searching unit 103. The degree of similarity can be calculated, for example, as a number of matches between Japanese characters used in Japan (Japanese kanjis) corresponding to Chinese characters used in the Chinese translation (Chinese kanjis), and kanjis included in the Japanese synonym.

Alternatively, the degree of similarity may be calculated as a ratio of matches between the Japanese kanjis corresponding to the Chinese kanjis included in the Chinese translation and the kanjis included in the Japanese synonym, to the total number of kanjis included in the Chinese translation. A manner of calculation of the degree of similarity is not limited to those cited above and any values can be employed as the degree of similarity as far as the values represent a degree of association between the Chinese translation and the Japanese synonym.

The corresponding kanji character searching unit 105 searches the kanji character correspondence information table 113, and acquires a Japanese kanji corresponding to a designated Chinese kanji. Detailed data structure of the kanji character correspondence information table 113 will be described later.

The translation selecting unit 106, when the translation dictionary searching unit 102 retrieves plural Chinese translations, selects a Chinese translation with a highest degree of similarity calculated by the similarity calculating unit 104. The output processing unit 107 outputs the Chinese translation selected by the translation selecting unit 106 to the output device 300.

The HDD 110 stores the Japanese-to-Chinese translation dictionary 111, the Japanese thesaurus 112, and the kanji character correspondence information table 113.

The Japanese-to-Chinese translation dictionary 111 is a dictionary in which each Japanese word is registered in association with an expression thereof and a Chinese translation thereof. FIG. 2 is an explanatory diagram of an example of a data structure of the Japanese-to-Chinese translation dictionary 111.

As shown in FIG. 2, when one Japanese word can be translated into plural Chinese words, the plural Chinese words are registered separated with a symbol ";". For example, a Japanese word J210 can be translated into three different Chinese words C201, C202, and C203. Hence, in a column of Chinese translation in FIG. 2, a Chinese translation C210 is shown in which the Chinese words C201, C202, and C203 are shown separated with ";".

The Japanese thesaurus 112 is a dictionary in which a Japanese word is registered in association with other Japanese words which have same meaning though in a different expression. In the Japanese thesaurus 112, synonyms are registered for each user. When the translation dictionary searching unit 102 finds plural Chinese translations hit, the Japanese thesaurus 112 is referred to for the calculation of the degrees of similarity with the respective Chinese translations.

When a word in a foreign language, for example, in English, is adopted in Japanese, the word is usually written in Katakana as to indicate the original pronunciation. Katakana, however, is a peculiarly Japanese character and hence, Japanese document including expressions in Katakana is difficult for those who speak Chinese alone to understand.

On the other hand, a foreign word may be represented not by the original sound but by its meaning with the Japanese kanjis. Japanese kanjis, though different from Chinese kanjis, have their origin in Chinese kanjis, and hence, if a foreign word is represented by Japanese kanjis, those who speak Chinese alone are likely to understand the Japanese document including words originally from foreign language.

If the words written in Katakana or Hiragana, which are peculiarly Japanese characters, can be replaced with expressions in Japanese kanjis, communication between Japan and China would be facilitated.

Thus, the Japanese thesaurus 112 which stores expressions in Katakana or Hiragana and expressions in Japanese kanjis with the same meaning in association with each other is employed to replace expressions in Katakana or Hiragana included in Japanese documents to expressions in Japanese kanjis, so as to convert the document into another form which is more readily understandable by those who speak Chinese alone.

In the first embodiment, the Japanese thesaurus 112 with such function is utilized in translation by the Japanese-to-Chinese machine translation apparatus 100.

FIG. 3 is an explanatory diagram of an example of a data structure of the Japanese thesaurus 112. In the example shown in FIG. 3, a kanji string J311, a kanji string J321, a kanji string J331, and a kanji string J341 are designated as synonyms of a Katakana string J310, a Katakana string J320, a Katakana string J330, and a Hiragana string J340, respectively.

The kanji character correspondence information table 113 is a table in which Chinese kanjis are registered in association with corresponding Japanese kanjis.

Japanese kanjis basically have their origins in Chinese kanjis. However, since kanjis took different paths of development in Japan and China, some kanjis are written differently in Japan and China though having the same meaning. Hence, in translation, information is necessary on correspondence between the Chinese kanjis and the Japanese kanjis which have the same origin and the same meaning with the corresponding Chinese kanjis. Such information is stored in the kanji character correspondence information table 113.

FIG. 4 is an explanatory diagram of an example of a data structure of the kanji character correspondence information table 113. As shown in FIG. 4, the kanji character correspondence information table 113 indicates, for example, that a Chinese kanji C410 used in China corresponds with a Japanese kanji J410 used in Japan.

Next, a machine translation by the Japanese-to-Chinese machine translation apparatus 100 according to the first embodiment with above-described structure will be described. In the following, it is assumed that contents as shown in FIGS. 2, 3, and 4 are registered in the Japanese-to-Chinese translation dictionary 111, the Japanese thesaurus 112, the kanji character correspondence information table 113, respectively. Hereinbelow, the Japanese-to-Chinese machine translation, which is performed when a word J220 shown in FIG. 2 is supplied as a Japanese input, will be described. The word J220 means "local" in English.

Figure 5:
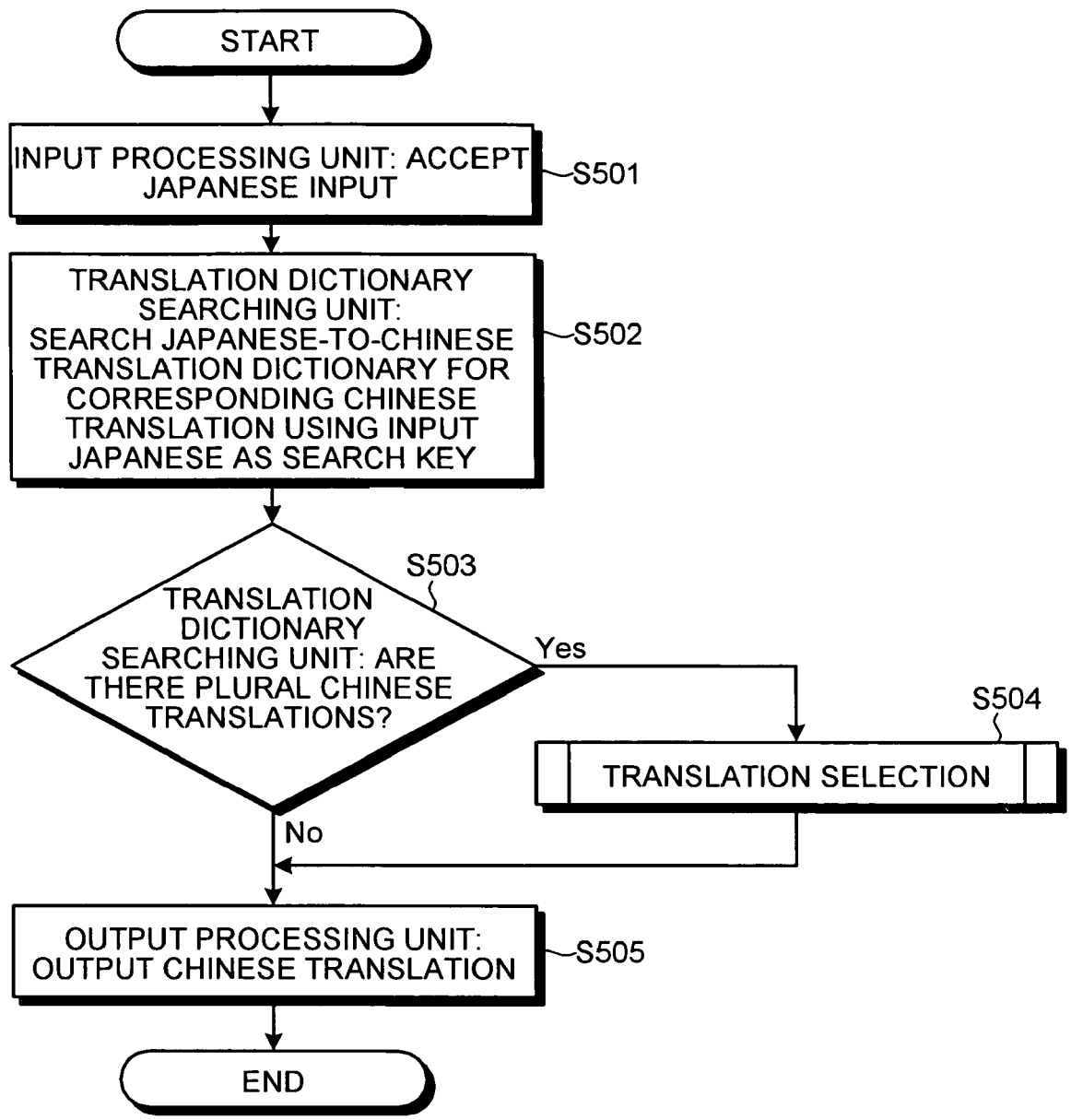
FIG. 5 is a flowchart of an overall process sequence of a machine translation according to the first embodiment.

FIG. 5 is a flowchart of an overall process sequence of the machine translation according to the first embodiment. First, in response to the Japanese input via the input device 200 by the user, the input processing unit 101 accepts the input Japanese (step S501).

Then, the translation dictionary searching unit 102 searches the Japanese-to-Chinese translation dictionary 111 for a corresponding Chinese translation using the input Japanese as a search key (step S502). For example, when the word J220 is provided as a Japanese input, the translation dictionary searching unit 102 searches the Japanese-to-Chinese translation dictionary 111 and retrieves a translation C220 as shown in FIG. 2 as a hit.

Then, the translation selecting unit 106 determines whether there are plural corresponding Chinese translations or not (step S503). On determining that there are plural Chinese translations (Yes in step S503), the translation selecting unit 106 performs a translation selection to select an appropriate Chinese translation among the candidates (step S504). The translation selection will be described later in detail.

When the translation selecting unit 106 determines that there are not plural Chinese translations (No in step S503), or after the translation selecting unit 106 performs the translation selection (step S504), the output processing unit 107 outputs the Chinese translation which found hit as a result of search or the Chinese translation selected as a result of the translation selection (step S505), to end the machine translation.

Figure 6:
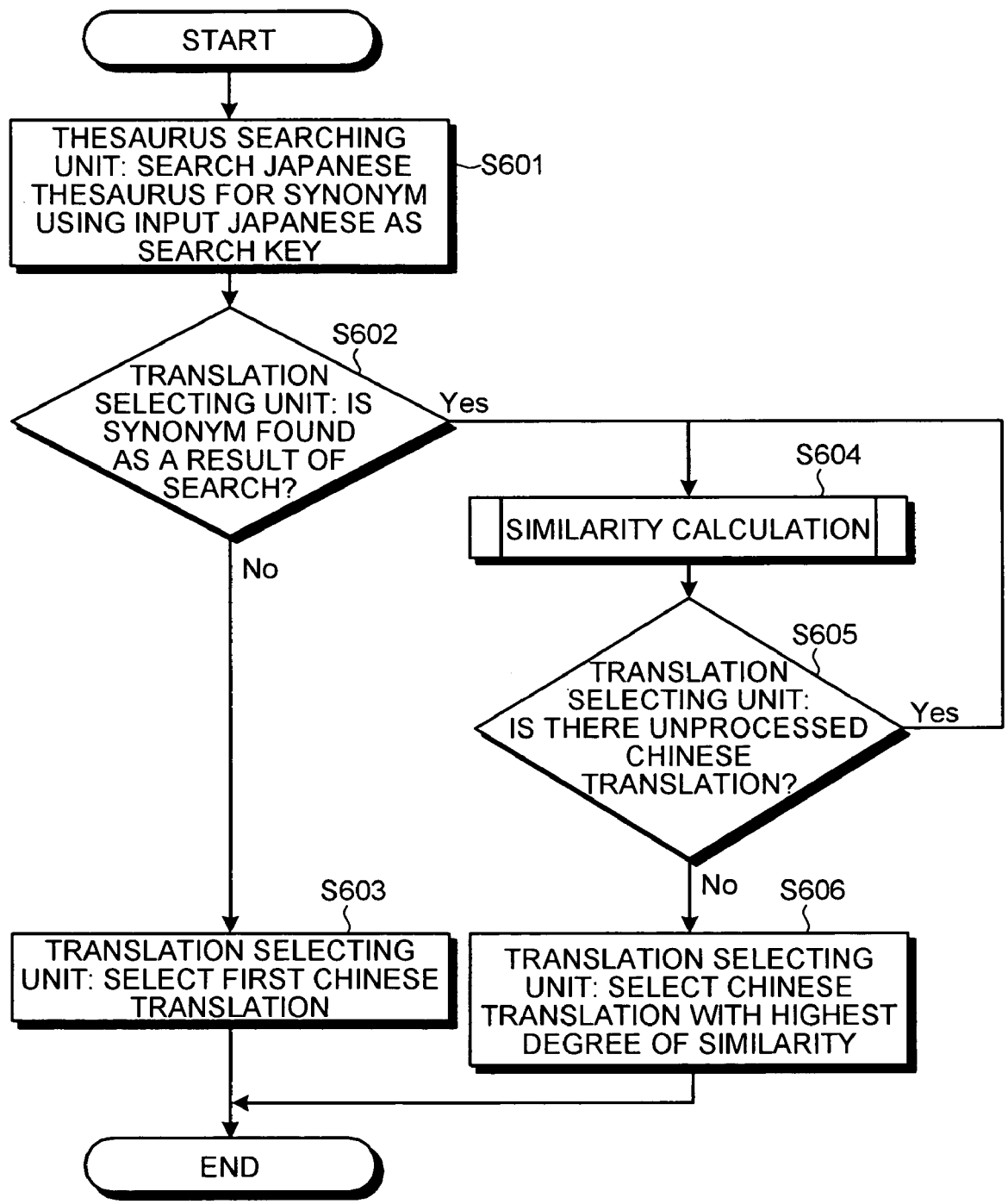
FIG. 6 is a flowchart of an overall process sequence of a translation selection according to the first embodiment.

Next, the translation selection performed in step S504 will be described in detail. FIG. 6 is a flowchart of an overall process sequence of the translation selection according to the first embodiment.

First, the thesaurus searching unit 103 searches the Japanese thesaurus 112 for a synonym using the input Japanese as a search key (step S601). For example, when the word J220 is supplied as a Japanese input, the thesaurus searching unit 103 searches the Japanese thesaurus 112 for a word J321 which corresponds with a word J320 as shown in FIG. 3 and is a synonym with the word J220.

Then, the translation selecting unit 106 determines whether there is a hit synonym or not (step S602). On determining that the there is no hit synonym (No in step S602), the translation selecting unit 106 selects a first Chinese translation as a translation to be output (step S603), to end the translation selection. For example, assume that the word J220 is supplied as a Japanese input and no synonym is hit. Then, the translation selecting unit 106 selects a word C221 which appears first among Chinese translations C220 that correspond to the word J220 shown in FIG. 2.

Here, priority may be previously set for plural Chinese translations, for example, according to a frequency of use of each translation. Then, the translation selection may be performed so that a Chinese translation with higher priority is selected preferentially. Then, even when the synonym is not found, selection of more appropriate Chinese translation may be allowed.

When the translation selecting unit 106 determines that there is a hit synonym in step S602 (Yes in step S602), a similarity calculation is performed to calculate a degree of similarity between the first Chinese translation among plural Chinese translations and the synonym (step S604). The similarity calculation will be described later in detail.

After the similarity calculation, the translation selecting unit 106 determines whether there is an unprocessed Chinese translation among plural Chinese translations or not (step S605). On determining that there is an unprocessed Chinese translation (Yes in step S605), the similarity calculation is performed again on the pertinent Chinese translation (step S604).

On determining that there is no unprocessed Chinese translation (No in step S605), the translation selecting unit 106 selects a Chinese translation with highest calculated degree of similarity obtained through the similarity calculation to be output as a translation (step S606), to end the translation selection.

Figure 7:
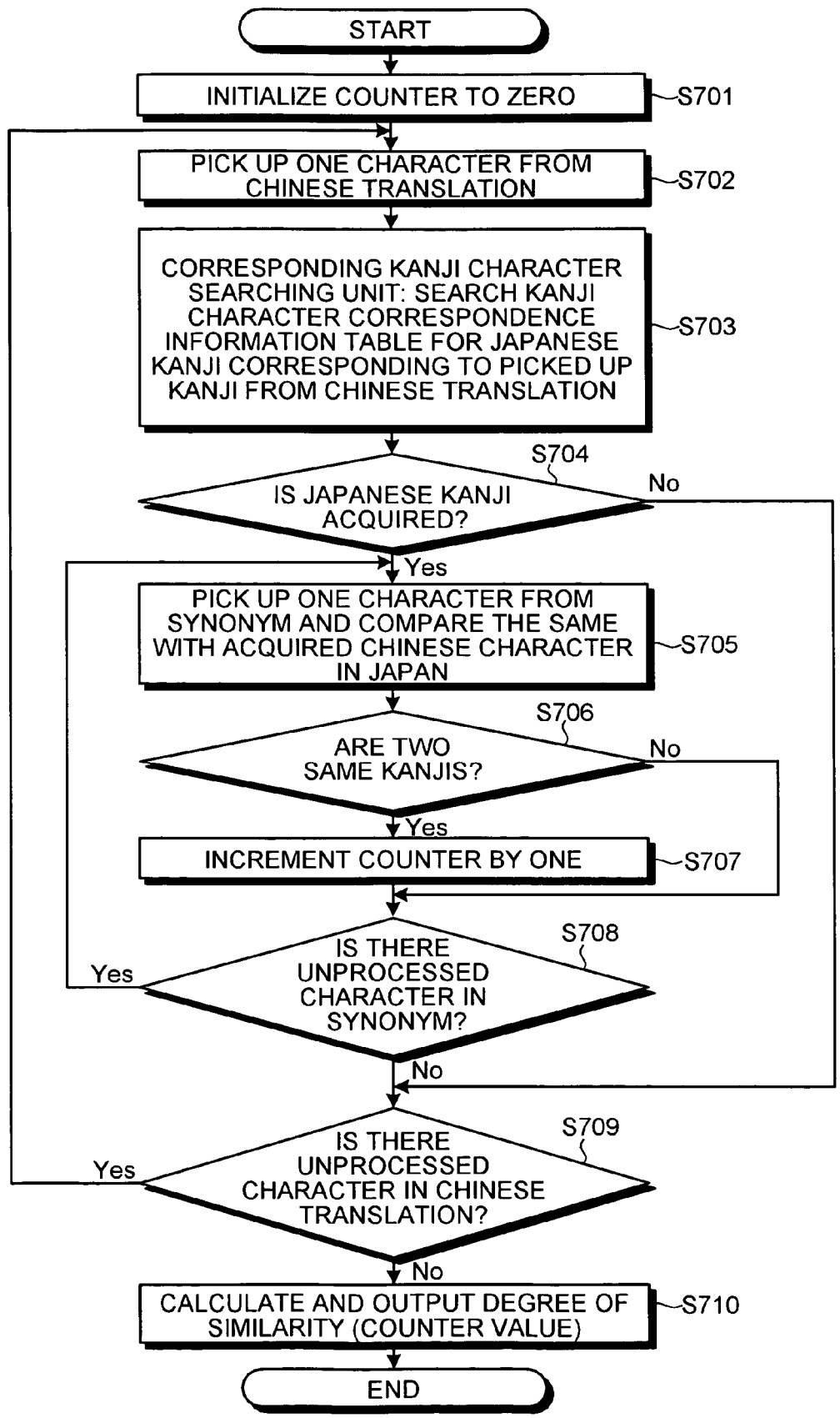
FIG. 7 is a flowchart of an overall process sequence of a similarity calculation according to the first embodiment.

The similarity calculation performed in step S604 will be described in detail. FIG. 7 is a flowchart of an overall process sequence of the similarity calculation according to the first embodiment.

First, the similarity calculating unit 104 initializes a counter, which serves to count up the number of matching characters, to zero (step S701). Then, the similarity calculating unit 104 picks up one character from supplied Chinese translations (step S702).

Then, the corresponding kanji character searching unit 105 searches the kanji character correspondence information table 113 for a Japanese kanji which corresponds with the character picked up from the Chinese translation by the similarity calculating unit 104 (step S703). Then, the similarity calculating unit 104 determines whether the corresponding kanji character searching unit 105 acquires a corresponding Japanese kanji or not (step S704). On determining that the character has not been acquired (No in step S704), the similarity calculating unit 104 determines whether there is an unprocessed character or not (step S709).

When the corresponding Japanese kanji is acquired (Yes in step S704), the similarity calculating unit 104 picks up one character from the synonyms hit in step S601 and compares the character with the Japanese kanji acquired from the kanji character correspondence information table 113 (step S705).

Then, the similarity calculating unit 104 determines whether the character picked up from the synonym is same with the Japanese kanji acquired from the kanji character correspondence information table 113 or not (step S706). On determining that the two are not the same (No in step S706), the similarity calculating unit 104 determines whether there is an unprocessed character in the synonym or not (step S708).

On determining that the character picked up from the synonym and the Japanese kanji acquired from the kanji character correspondence information table 113 are the same (Yes in step S706), the similarity calculating unit 104 increments the counter, which serves to count up the number of matched characters, by one (step S707).

Thereafter, the similarity calculating unit 104 determines whether there is an unprocessed character in the synonym or not (step S708). On determining that there is an unprocessed character (Yes in step S708), the similarity calculating unit 104 picks up a next character among synonym and repeats the same process (step S705).

On determining that there is no unprocessed character in the synonym (No in step S708), the similarity calculating unit 104 determines whether there is an unprocessed character in Chinese translation or not (step S709). On determining that there is an unprocessed character in Chinese translation (Yes in step S709), the similarity calculating unit 104 picks up a next character of the Chinese translation and repeats the same process (step S702).

On determining that there is no unprocessed character in the Chinese translation (No in step S709), the similarity calculating unit 104 outputs the value of the counter as the value of the degree of similarity (step S710), to end the similarity calculation.

When the word J220 is supplied as a Japanese input, the synonym J321, and three Chinese translations C221, C222, and C223 are obtained. When the degrees of similarity of three Chinese translations with the synonym J321 are calculated, for example, when the degree of similarity between the Chinese translation C221 and the synonym J321 is calculated, since there is no matching character in two words, the degree of similarity is given as zero.

Similarly, since the Chinese translation C222 and the synonym J321 have no matching characters, the degree of similarity is zero. The Chinese translation C223 includes the first character in the synonym J321, and therefore the degree of similarity is one. The Chinese translation C223 has the highest degree of similarity among three Chinese translations and hence is selected as an appropriate Chinese translation.

The user who registers the contents as shown in FIG. 3 in the Japanese thesaurus 112 can be regarded as a user who frequently deals with the documents on computer-related fields, for example. For such user, more suitable Chinese translation for the Japanese word J220 (which means "local" in English), in most of the cases, is the Chinese translation C223 (which means "local portion") which appears third in the contents rather than the first Chinese translation C221 (which means "countryside") in the registered contents of the Japanese-to-Chinese translation dictionary 111. The Japanese-to-Chinese machine translation apparatus 100 according to the first embodiment refers to the contents of the Japanese thesaurus 112, so that more suitable Japanese-to-Chinese translation can be provided to each user.

In the above-described embodiment, the degree of similarity is determined solely based on the presence of the matching kanji. However, the Japanese-to-Chinese machine translation apparatus may be structured as to determine the degree of similarity in view of the position of the matching character in the pertinent word. For example, when the synonym J321 corresponds with the Chinese translation C223 and another Chinese translation which includes two kanjis appear in the Chinese translation C223 in reverse order, both Chinese translations are determined to have only one matching character (Chinese kanji C410 in FIG. 4) and the degrees of similarity thereof are both determined to be one. However, since the Chinese translation C223 includes the matching character at the same position with the synonym, i.e., at the start of the word, the degree of similarity may be weighted as to be higher for the Chinese translation C223 in the similarity calculation.

Figure 8:
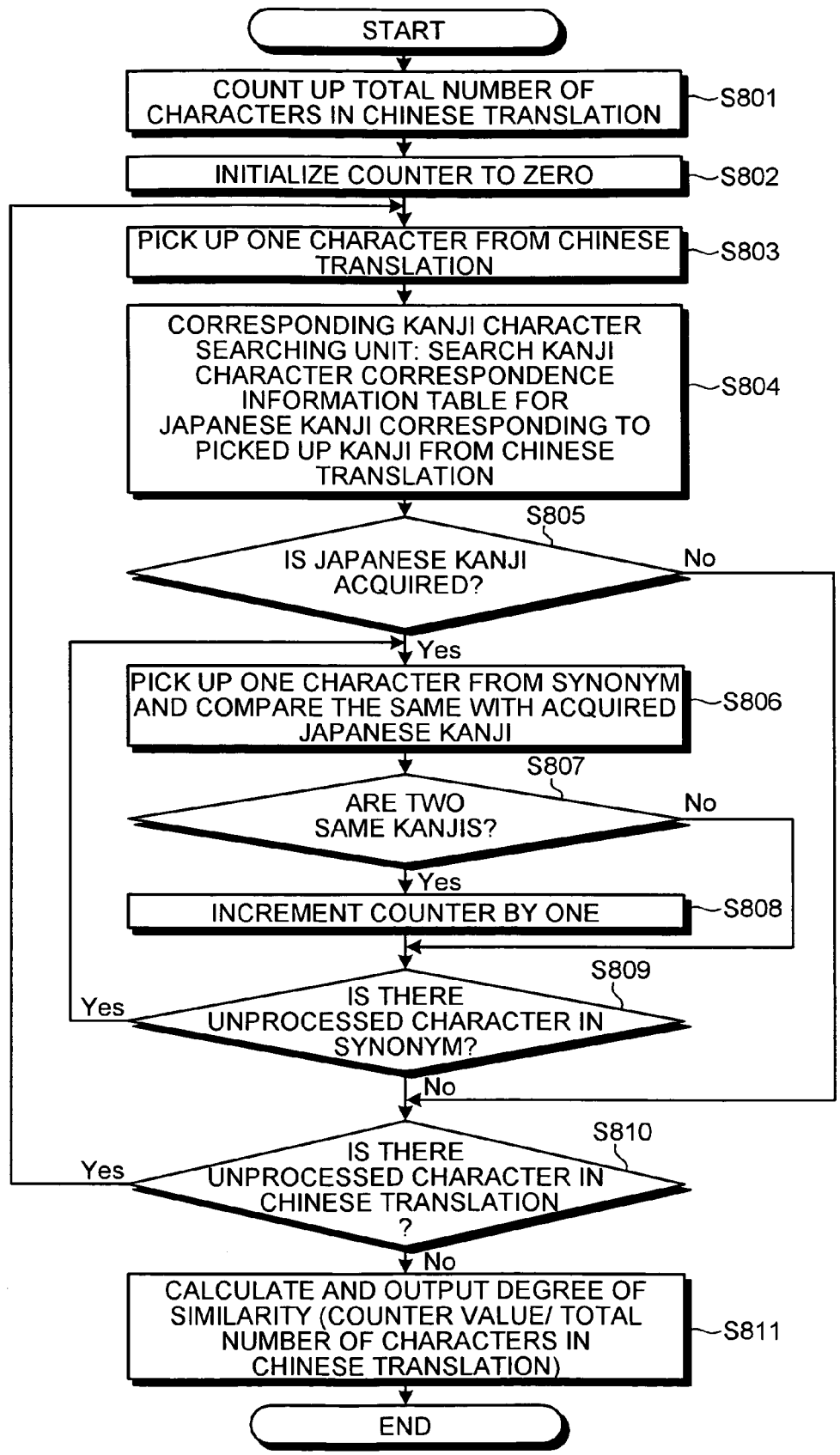
FIG. 8 is a flowchart of an overall process sequence of a similarity calculation according to the first embodiment.

In addition, the Japanese-to-Chinese machine translation apparatus 100 may be structured as to calculate the degree of similarity as a ratio of the matching character among the total number of the characters in the Chinese translation. Here, the matching character is the same character appears in the synonym and the Chinese translation represented with the corresponding Japanese kanjis. FIG. 8 is a flowchart of an overall process sequence of the similarity calculation based on the ratio of matching characters.

First, the similarity calculating unit 104 counts up the total number of characters included in a given Chinese translation (step S801). A process of counting up the number of the matching characters from step S802 to step S810 is same with the process from step S701 to step S709 of FIG. 7, and the description thereof is not repeated.

After the processing of all characters (No in step S810), the similarity calculating unit 104 calculates the ratio of the matching characters as the degree of similarity, in other words, divides the counter value by the total number of the characters in the Chinese translation counted up in step S801, and supplies the obtained quotient as an output (step S811).

For example, when the word J220 is supplied as a Japanese input and the degree of similarity is calculated as shown in FIG. 8, the degree of similarity between the Chinese translation C221 and the synonym J321 is zero, the degree of similarity between the Chinese translation C222 and the synonym J321 is zero, and the degree of similarity between the Chinese translation C223 and the synonym J321 is ½ (number of matching characters=1/the total number of characters=2) =0.5.

When the number of matching characters is employed as the degree of similarity, a Chinese translation that includes more characters than other Chinese translations may be determined to have a higher degree of similarity and selected because it may include relatively larger number of matching characters, even if the ratio of the matching characters to all characters is lower than other Chinese translations. However, such Chinese translation may include more non-matching characters as well as the matching characters, and may not be suitable as the selected Chinese translation. If the ratio of the matching characters is employed as the degree of similarity, such inconvenience can be eliminated to allow for the selection of suitable Chinese translation.

Thus, the Japanese-to-Chinese machine translation apparatus 100 according to the first embodiment, on acquiring plural Chinese translations for the Japanese input, searches the Japanese thesaurus, which stores registered words for each user, for a synonym of the Japanese input using the Japanese input as a search key, and preferentially selects a Chinese translation with a highest degree of similarity to the synonym among the plural Chinese translations. Hence, the user does not need to select the suitable translation by him/ herself. In addition, the output of the translation result can be optimized for each user.

A Japanese-to-Chinese machine translation apparatus according to a second embodiment replaces a Chinese kanji included in a Chinese translation for a Japanese input with a Japanese kanji, if there is one, and calculates the degree of similarity thereafter based on an editing distance between the Chinese translation after replacement and the synonym. Here, the "editing distance" means the number of editing operations, such as deletion, insertion, and replacement required for the replacement of one character string with another character string.

Figure 9:
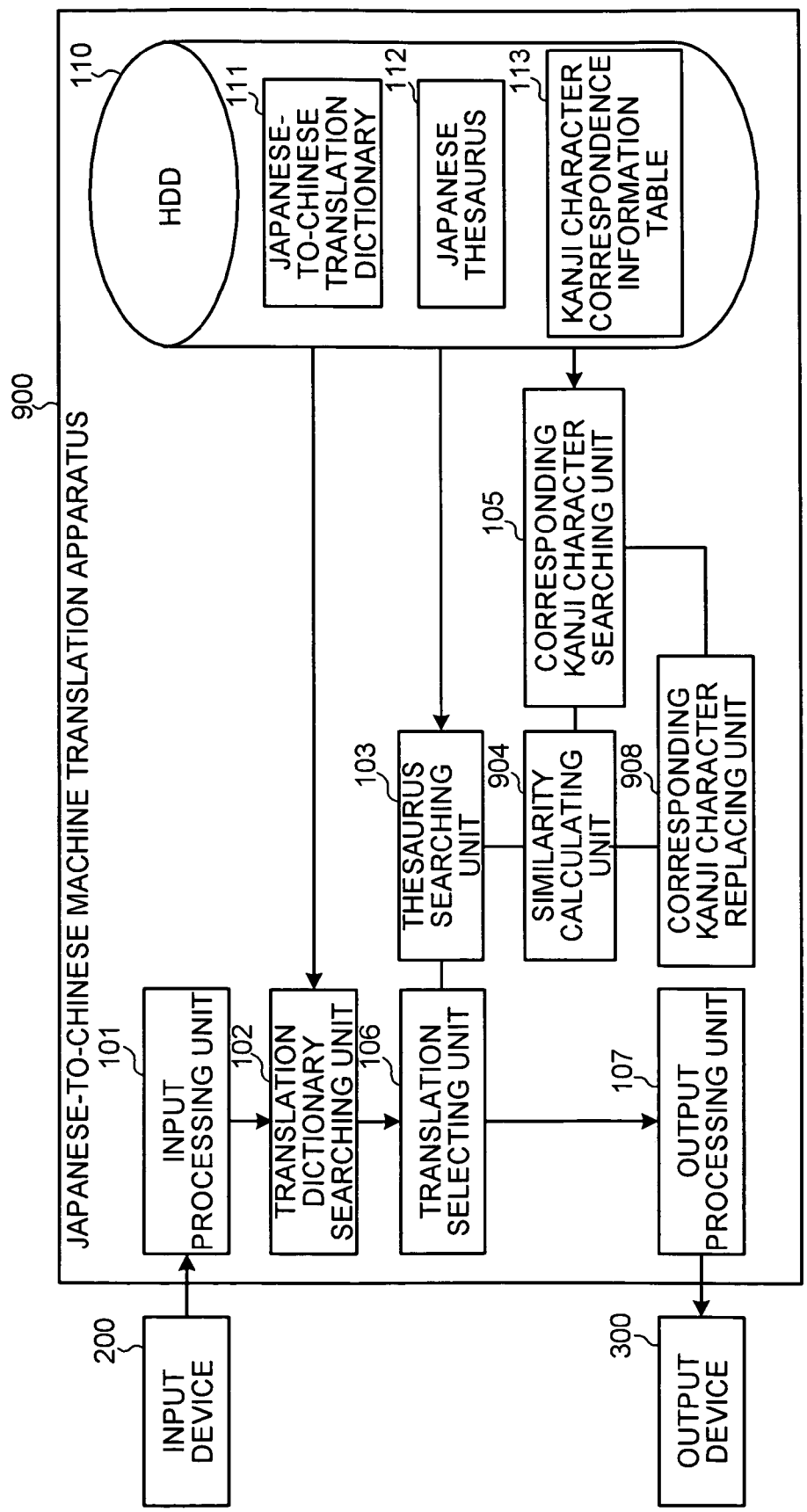
FIG. 9 is a block diagram of a structure of a Japanese-to-Chinese machine translation apparatus according to a second embodiment.

FIG. 9 is a block diagram of a structure of a Japanese-to-Chinese machine translation apparatus 900 according to the second embodiment. As shown in FIG. 9, the Japanese-to-Chinese machine translation apparatus 900 includes the input processing unit 101, the translation dictionary searching unit 102, the thesaurus searching unit 103, a similarity calculating unit 904, the corresponding kanji character searching unit 105, the translation selecting unit 106, the output processing unit 107, a corresponding kanji character replacing unit 908, and the HDD 110.

The second embodiment is different from the first embodiment in that the corresponding kanji character replacing unit 908 is added and the function of the similarity calculating unit 904 is changed. Other structures and functions are same with those in the Japanese-to-Chinese machine translation apparatus 100 according to the first embodiment having the structure as shown in the block diagram of FIG. 1. Hence, the same elements will be represented with the same reference characters as in FIG. 1 and the description thereof will not be repeated.

The corresponding kanji character replacing unit 908 replaces a Chinese kanji included in a Chinese translation for the Japanese input with a Japanese kanji, when such kanji, which is used in Japan and corresponds to the Chinese kanji in the Chinese translation, is found through the search by the corresponding kanji character searching unit 105, and outputs the Chinese translation after the replacement.

The similarity calculating unit 904 calculates the degree of similarity according to the editing distance between the Chinese translation after the replacement supplied as the output from the corresponding kanji character replacing unit 908 and the Japanese synonym. The editing distance may be calculated according to various conventional techniques such as Smith-Waterman algorithm.

Next, the machine translation by the Japanese-to-Chinese machine translation apparatus 900 according to the second embodiment with the above-described structure will be described. An overall process sequence of the machine translation and the translation selection performed in the machine translation according to the second embodiment are same with those according to the first embodiment shown in FIGS. 5 and 6, and the detailed description thereof will not be repeated.

The similarity calculation performed in the translation selection according to the second embodiment is different from that performed according to the first embodiment. FIG. 10 is a flowchart of an overall process sequence of the similarity calculation according to the second embodiment.

The search of the corresponding Japanese kanji carried out from step S1001 to step S1003 is same with the process from step S702 to step S704 shown in FIG. 7 and the detailed description thereof will not be repeated.

When no corresponding Japanese kanji is acquired in step S1003 (No in step S1003), the similarity calculating unit 904 determines whether there is an unprocessed character or not (step S1005). When corresponding Japanese kanji is acquired (Yes in step S1003), the corresponding kanji character replacing unit 908 replaces the Chinese kanji in the Chinese translation with the Japanese kanji as acquired (step S1004).

Then, the similarity calculating unit 904 determines whether there is an unprocessed character in the Chinese translation or not (step S1005). When there is an unprocessed character in the Chinese translation (Yes in step S1005), the similarity calculating unit 904 picks up a next character from the Chinese translation and repeats the process (step S1001).

When there is no unprocessed character in the Chinese translation (No in step S1005), the similarity calculating unit 904 calculates the editing distance between the Chinese translation after the replacement and the synonym (step S1006). For example, with the replacement of a Japanese kanji J430 used in Japan (the last Chinese kanji in the Chinese translation C223) shown in FIG. 4 with a Japanese kanji J420 used in Japan shown in FIG. 4, the Chinese translation C223 can be converted into the synonym J321. Thus the editing distance is one.

When the word J220 is supplied as a Japanese input and the editing distance is calculated as shown in FIG. 10, the editing distance between the Chinese translation C221 and the synonym J321 is two, the editing distance between the Chinese translation C222 and the synonym J321 is three, and the editing distance between the Chinese translation C223 and the synonym J321 is one.

After the calculation of the editing distance, the similarity calculating unit 904 outputs the value of the editing distance calculated as the value of the degree of similarity (step S1007), to end the similarity calculation process.

Here, since a smaller editing distance means a higher degree of similarity between character strings, when the editing distance is employed to indicate the degree of similarity, the degree of similarity is set so that a smaller editing distance corresponds with a higher degree of similarity. For example, the degree of similarity may be set as an inverse number of the editing distance. Alternatively, the value of the editing distance may be employed as it is as the degree of similarity. Then, a Chinese translation with a lowest degree of similarity (editing distance) may be selected in step S606.

Thus, the Japanese-to-Chinese machine translation apparatus 900 according to the second embodiment can replace a Chinese kanji included in a Chinese translation of a Japanese input with a corresponding Japanese kanji, if there is one, and calculate the degree of similarity according to the editing distance between the Chinese translation after the replacement and the Japanese synonym. Hence, an accuracy of similarity calculation can be improved. At the same time, the user does not need to select a suitable translation by him/herself and the output of the result of translation can be optimized for each user.

Here in the first and the second embodiments, the Japanese-to-Chinese machine translation apparatus with a simple structure is described which accepts a Japanese word as an input and searches the Japanese-to-Chinese translation dictionary using the entire input Japanese word as a search key. Alternatively, the present invention is applicable to a Japanese-to-Chinese machine translation apparatus which accepts a Japanese sentence as an input, divides the sentence into words, finds a Chinese translation for each word, and outputs the results. Still alternatively, the present invention is applicable to a Japanese-to-Chinese machine translation apparatus which similarly accepts a Japanese sentence as an input and outputs a Chinese sentence as a translation result.

The Japanese-to-Chinese machine translation apparatus according to the first and the second embodiments includes a controller such as a central processing unit (CPU), a storage such as a read only memory (ROM) or a random access memory (RAM), an external storage such as a hard disk drive (HDD), a compact disc (CD) drive, a display, and an input device such as a keyboard or a mouse, and have a hardware structure utilizing a conventional computer.

A Japanese-to-Chinese machine translation program performed by the Japanese-to-Chinese machine translation apparatus according to the first or the second embodiment is recorded in a computer-readable recording medium such as a compact disk read only memory (CD-ROM), a flexible disc (FD), a compact disk recordable (CD-R), a digital versatile disk (DVD) as a file of an installable or an executable format for provision.

Further, the Japanese-to-Chinese machine translation program performed by the Japanese-to-Chinese machine translation apparatus according to the first or the second embodiment may be stored in a computer connected to a network such as the Internet, and downloaded via the network for provision. Still further, the Japanese-to-Chinese machine translation program performed in the Japanese-to-Chinese machine translation apparatus according to the first or the second embodiment may be provided or distributed via a network such as the Internet.

Still further, the Japanese-to-Chinese machine translation program according to the first or the second embodiment may be embedded in a ROM or the like for provision.

The Japanese-to-Chinese machine translation program performed by the Japanese-to-Chinese machine translation apparatus according to the first or the second embodiment has a module structure including above-described units (input processing unit, translation dictionary searching unit, thesaurus searching unit, similarity calculating unit, corresponding kanji character searching unit, translation selecting unit, output processing unit, and corresponding kanji character replacing unit), and is structured as an actual hardware so that the CPU reads out the Japanese-to-Chinese machine translation program from the recording medium to execute the same, thereby loading the above-described respective units in a main memory and generating the same on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A Japanese-to-Chinese machine translation apparatus comprising:
    a translation dictionary memory that stores a Japanese-to-Chinese translation dictionary in which a Japanese word and at least one Chinese word which is a translation of the Japanese word are registered in association with each other;
    a thesaurus memory that stores a Japanese thesaurus in which a Japanese word and a synonym of the Japanese word are registered in association with each other, the synonym being a Japanese word representing a same meaning with the associated Japanese word in a different expression;
    a translation dictionary searching unit that searches the Japanese-to-Chinese translation dictionary for a Chinese word that is associated with an input Japanese word and determines whether plural Chinese words are hit as a result of search as the Chinese word that is associated with the input Japanese word;
    a thesaurus searching unit that searches the Japanese thesaurus for the synonym that is associated with the input Japanese word when the plural Chinese words are hit;
    a similarity calculating unit that calculates a degree of similarity between the synonym and each of the plural Chinese words associated with the input Japanese word, for each of the plural Chinese words; and
    a translation selecting unit that selects a Chinese word with a highest degree of similarity as a translation of the input Japanese word.

2. The Japanese-to-Chinese machine translation apparatus according to claim 1, further comprising:
    a kanji character correspondence information memory that stores kanji character correspondence information in which a Chinese kanji character and a corresponding Japanese kanji character are registered in association with each other; and
    a corresponding kanji character searching unit that searches the kanji character correspondence information for a Japanese kanji character which is associated with a Chinese kanji character included in the Chinese word associated with the input Japanese word,
    wherein the similarity calculating unit calculates as the degree of similarity a number of matches between Japanese kanji characters as a result of search by the corresponding kanji character searching unit and kanji characters included in a synonym as a result of search by the thesaurus searching unit, among kanji characters included in the Chinese word associated with the input Japanese word.

3. The Japanese-to-Chinese machine translation apparatus according to claim 2, wherein the plural Chinese words including a first Chinese word and a second Chinese word, and the similarity calculating unit calculates the degree of similarity in such a manner that a degree of similarity for the first Chinese word is higher than a degree of similarity for the second Chinese word, if a number of matches between first Japanese kanji characters which are associated with first Chinese kanji characters included in the first Chinese word and the kanji characters included in the synonym is equal to a number of matches between second Japanese kanji characters which are associated with second Chinese kanji characters included in the second Chinese word and the kanji characters included in the synonym, and if a number of matches between positions in the first Chinese word of the first Chinese kanji characters corresponding to the first Japanese kanji characters and positions in the synonym of the first Japanese kanji characters is larger than a number of matches between positions in the Chinese word of the second Chinese kanji characters corresponding to the second Japanese kanji characters and positions in the synonym of the second Japanese kanji characters.

4. The Japanese-to-Chinese machine translation apparatus according to claim 1, further comprising:

a kanji character correspondence information memory that stores kanji character correspondence information in which a Chinese kanji character and a corresponding Japanese kanji character are registered in association with each other; and a corresponding kanji character searching unit that searches the kanji character correspondence information for a Japanese kanji character that is associated with a Chinese kanji character included in the Chinese word associated with the input Japanese word, wherein the similarity calculating unit calculates as the degree of similarity a ratio of a number of matches between the Japanese kanji characters as searched by the corresponding kanji character searching unit and the kanji characters included in the synonym as searched by the thesaurus searching unit to a total number of kanji characters included in the Chinese word associated with the input Japanese word.

5. The Japanese-to-Chinese machine translation apparatus according to claim 4, wherein the plural Chinese words including a first Chinese word and a second Chinese word, and the similarity calculating unit calculates the degree of similarity in such a manner that a degree of similarity for the first Chinese word is higher than a degree of similarity for the second Chinese word, if a number of matches between first Japanese kanji characters which are associated with first Chinese kanji characters included in the first Chinese word and the kanji characters included in the synonym is equal to a number of matches between second Japanese kanji characters which are associated with second Chinese kanji characters included in the second Chinese word and the kanji characters included in the synonym, and if a number of matches between positions in the first Chinese word of the first Chinese kanji characters corresponding to the first Japanese kanji characters and positions in the synonym of the first Japanese kanji characters is larger than a number of matches between positions in the Chinese word of the second Chinese kanji characters corresponding to the second Japanese kanji characters and positions in the synonym of the second Japanese kanji characters.

6. The Japanese-to-Chinese machine translation apparatus according to claim 1, further comprising:

a kanji character correspondence information memory that stores kanji character correspondence information in which a Chinese kanji character used in China and a corresponding Japanese kanji character are registered in association with each other;

a corresponding kanji character searching unit that searches the kanji character correspondence information for a Japanese kanji character that is associated with a Chinese kanji character included in the Chinese word associated with the input Japanese word; and a corresponding kanji character replacing unit that replaces a Chinese kanji character included in the Chinese word associated with the input Japanese word with the corresponding Japanese kanji character found by the corresponding kanji character searching unit as a result of search, and that outputs a Chinese word obtained as a result of replacement, wherein the similarity calculating unit calculates the degree of similarity based on an editing distance which is a number of editing operations to convert the Chinese word obtained as the result of replacement to the synonym searched by the thesaurus searching unit.

7. The Japanese-to-Chinese machine translation apparatus according to claim 6, wherein the similarity calculating unit calculates the degree of similarity so that a shorter editing distance represents a higher degree of similarity.

8. The Japanese-to-Chinese machine translation apparatus according to claim 1, wherein the translation dictionary memory stores a priority of selection for each Chinese word in the Japanese-to-Chinese translation dictionary, when there are plural Chinese words each of which is a translation of a Japanese word, and the translation selecting unit selects a Chinese word with a highest priority of selection as a translation of the input Japanese word when plural Chinese words are hit, and when no synonym is hit by the thesaurus searching unit.

9. The Japanese-to-Chinese machine translation apparatus according to claim 1, wherein the thesaurus memory stores the Japanese thesaurus in which a Japanese word represented by Katakana and a synonym of the Japanese word are registered in association with each other, the synonym being a Japanese word which represents the same meaning as the Japanese word in Katakana in an expression with a kanji character.

10. The Japanese-to-Chinese machine translation apparatus according to claim 1, wherein the thesaurus memory stores the Japanese thesaurus in which a Japanese word represented in Hiragana and a synonym of the Japanese word are registered in association with each other, the synonym being a Japanese word which represents the same meaning with the Japanese word in Hiragana in an expression with a kanji character.

11. A computer-implemented method of Japanese-to-Chinese machine translation, comprising:

searching, using a processing unit, a Japanese-to-Chinese translation dictionary stored in a translation dictionary storage unit, in which a Japanese word and at least one Chinese word which is a translation of the Japanese word are registered in association with each other, for a Chinese word associated with an input Japanese word;

determining, using the processing unit, whether plural Chinese words that are hit as a result of search are to be associated with the input Japanese word;

searching a Japanese thesaurus stored in a thesaurus storage unit, in which a Japanese word and a synonym of the Japanese word are registered in association with each other, the synonym being a Japanese word representing a same meaning in a different expression, for a synonym associated with the input Japanese word, when plural Chinese words are hit;

calculating, using the processing unit, a degree of similarity between the synonym and the plural Chinese words associated with the input Japanese word, for each of the plural Chinese words; and selecting, using the processing unit, a Chinese word with a highest degree of similarity as a translation of the input Japanese word.

12. A computer program product having a computer readable medium including instructions for causing a computer to execute Japanese-to-Chinese machine translation, wherein the instructions, when executed by the computer, cause the computer to perform:

searching a Japanese-to-Chinese translation dictionary stored in a memory, in which a Japanese word and at least one Chinese word which is a translation of the Japanese word are registered in association with each other, for a Chinese word associated with an input Japanese word;

determining whether plural Chinese words that are hit as a result of search are to be associated with the input Japanese word;

searching a Japanese thesaurus stored in a memory, in which a Japanese word and a synonym of the Japanese word are registered in association with each other, the synonym being a Japanese word representing a same meaning in a different expression, for a synonym associated with the input Japanese word, when plural Chinese words are found;

calculating a degree of similarity between the synonym and the plural Chinese words associated with the input Japanese word, for each of the plural Chinese words; and selecting a Chinese word with a highest degree of similarity as a translation of the input Japanese word.

* * * * *